(12) United States Patent
Nakai

(10) Patent No.: US 6,735,764 B2
(45) Date of Patent: May 11, 2004

(54) AUTOMATIC MACHINE APPLICATION PROGRAM DEVELOPMENT SYSTEM AND COMPUTER PRODUCT

(75) Inventor: Satoru Nakai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/232,720

(22) Filed: Sep. 3, 2002

(65) Prior Publication Data

US 2003/0167096 A1 Sep. 4, 2003

(30) Foreign Application Priority Data

Mar. 1, 2002 (JP) ........................................ 2002-056463

(51) Int. Cl.[7] ................................................ G06F 9/45
(52) U.S. Cl. .......................... 717/156; 717/106; 700/18
(58) Field of Search ............................... 700/17, 18, 83, 700/86; 345/762–763, 965–967; 717/114, 119, 129, 156–157, 105, 109, 113

(56) References Cited

U.S. PATENT DOCUMENTS

| | | | | |
|---|---|---|---|---|
| 5,187,788 A | * | 2/1993 | Marmelstein | ................ 717/109 |
| 5,355,062 A | | 10/1994 | Takizawa et al. | |
| 5,392,207 A | | 2/1995 | Wilson et al. | |
| 5,565,748 A | | 10/1996 | Takizawa et al. | |
| 5,586,335 A | | 12/1996 | Utan | |
| 5,970,243 A | * | 10/1999 | Klein et al. | ................... 717/113 |
| 6,179,490 B1 | * | 1/2001 | Pruitt | ......................... 717/109 |
| 6,226,555 B1 | * | 5/2001 | Kallal et al. | ................... 700/21 |
| 2001/0056306 A1 | | 12/2001 | Nakai et al. | |
| 2002/0054098 A1 | * | 5/2002 | Schmitt et al. | ............. 345/762 |
| 2003/0023326 A1 | * | 1/2003 | Shah | ........................... 700/18 |
| 2003/0036813 A1 | * | 2/2003 | Gasiorek et al. | .............. 700/87 |
| 2003/0130752 A1 | * | 7/2003 | Gasiorek et al. | .............. 700/86 |

FOREIGN PATENT DOCUMENTS

| | | |
|---|---|---|
| JP | 11-45103 | 2/1999 |
| JP | 2002-7299 | 1/2002 |

OTHER PUBLICATIONS

Lewis, R.W.; "Programming industrial control systems using IEC 1131–3", *IEE control engineering series 50*, p. 168–169.

* cited by examiner

*Primary Examiner*—Ramesh Patel
*Assistant Examiner*—Ronald D Hartman, Jr.
(74) *Attorney, Agent, or Firm*—Leydig, Voit & Mayer, Ltd.

(57) ABSTRACT

The automatic machine application program development system has a tool area in which a new component as an element for describing a program as a flowchart is installed, and a drawing area in which a flowchart is created using this new component. The new component includes at least one of a parallel execution component and a parallel execution waiting component paired with this parallel execution component, an interruption component, and a subroutine component in which a subroutine program can be described.

22 Claims, 9 Drawing Sheets

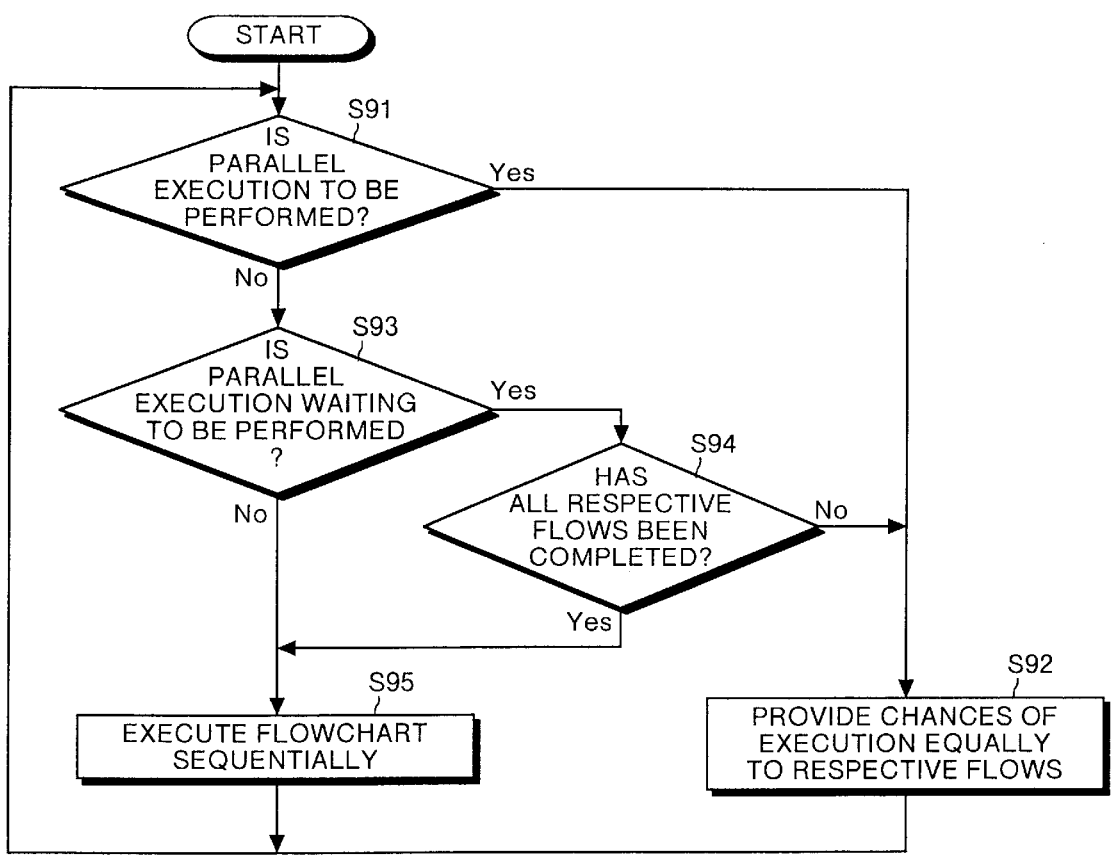

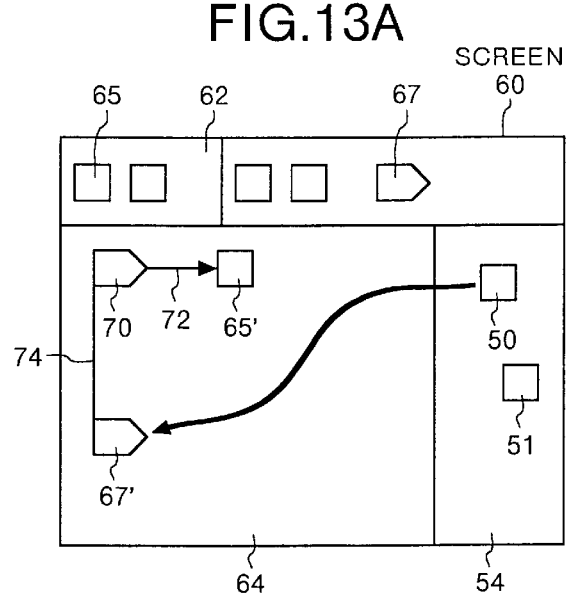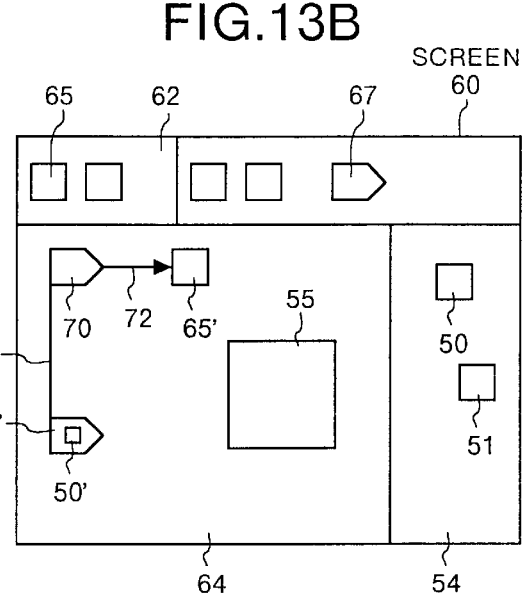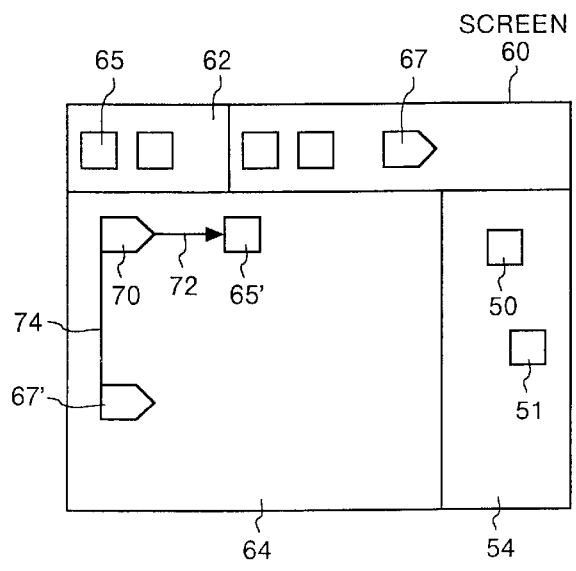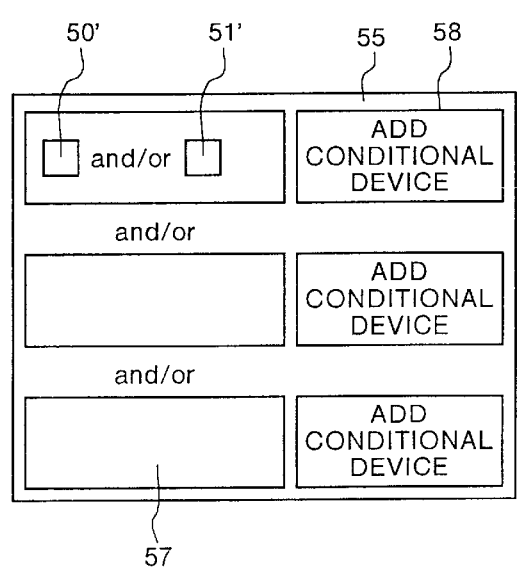

AUTOMATIC MACHINE APPLICATION PROGRAM DEVELOPMENT SYSTEM AND COMPUTER PRODUCT

FIELD OF THE INVENTION

This invention relates to an automatic machine application program development system, which maintains the advantage of a common flowchart conventionally used for programming (referred to a conventional flowchart) and extends the conventional flowchart so that all programs essential for the operation of an automatic machine can be described, and computer products.

BACKGROUND OF THE INVENTION

Programming languages conventionally used when describing a program for operating general-purpose automatic machines such as machine tools, industrial automatic machines such as industrial robots, autonomous robots and various automated facilities used in the field of factory automation (FA) have advantages and disadvantages.

For example, when the text language represented by C Language describes a program, the program grammar must be learnt, and hence in order to actually describe the program, a programmer must learn the skills thereof, which requires labor. The program described in the text language is not compatible with a display format by graphics, that is, graphical format, and hence it is not suitable from the standpoint of legibility (visual plainness and readability).

When a program is described by the Ladder Diagram (referred to as LD), being another language, this LD starting from a relay circuit is adaptable to the event-driven programming, but has a problem in that sequence processing essential for the operation of the automatic machine is hard to be described. Since description which hierarchizes the program, such as subroutine, cannot be done, it is difficult to create a large-scale and advanced modular program. Further, the program created by the LD has another problem in that reusability is low.

In a case of program description by a function block diagram (referred to as FBD), the data flow is expressed graphically by a combination of function blocks, and hence description is easy to understand, without requiring learning of the program grammar as in the text language, and the legibility of the described program is excellent. Hence, it is suitable for describing a program for continuous data processing. However, since the processing is gathered in the function block, it is not suitable for describing a program for sequence control such as sequence processing. Also in this instant, the program for operating the general automatic machine by the controller is mainly a program for sequence control such as sequence processing, and hence it cannot be said that the program description by the FBD is an optimum language for the controller.

When a program is described using a state transition diagram, an interruption program such that the automatic machine is urgently stopped in a safe manner when an emergency stop button is pressed, can be described graphically, and the legibility of the described program is excellent without requiring learning of the program grammar like the text language. The state transition diagram, however, is expressed mainly for the status maintenance or status transition, and hence the description of programs of the sequence control such as sequence processing is inferior in legibility. In view of this point, a flow chart type method described later has superior legibility of the described program to the state transition diagram.

When a program is described using a sequential function chart (referred to SFC), this SFC developed from the existing technique is a description language defined by the International Standard and expressed in the state transition diagram, where a step which is an operation output and a transition which is a condition input are coupled by an arc, and parallel branches can be also expressed. The SFC also conforms to the sequence control program such as sequence processing, which is a program for operating the general automatic machine by a controller, to some extent, and is also suitable for description of an interruption program (event-driven program), such that when an emergency stop button is pressed, the automatic machine is urgently stopped in a safe manner. However, as described above, the graphical expression such as coupling of the step and transition by an arc has poor legibility, and a big negative factor is that it is not familiar to the general public. The expression of parallel branches is a description close to extension of the LD which performs simultaneous parallel processing.

As described above, there are various programming languages for describing a program for operating an automatic machine, but these languages have advantages and disadvantages, respectively. Since the program for operating the general automatic machine by a controller is a sequence control program such as sequence processing, the present inventor has paid attention to the conventional flowchart.

The conventional flowchart is for describing the flow of the sequence control program such as sequence processing graphically in a chart format, and the legibility of the described program is excellent without requiring learning of the program grammar. This is a graphical form most familiar to the general public.

However, it is not suitable for describing, for example, the interruption program. That is, the description of the interruption program (event-driven program), such that the automatic machine is urgently stopped in a safe manner when an emergency stop button is pressed, is very important. The conventional flowchart conforms to this application to some extent, but it is not the best for the application. That is, the conventional flowchart cannot describe all programs essential for the operation of the automatic machine.

In Japanese Patent Application No. 11-45103, as the conventional art, there is an interruption description in the flowchart, but the start of interruption or the graphic expression of interruption is hard to understand, and there is a disadvantage in legibility. Further, the interruption condition setting method is different from the method of the present invention described later.

SUMMARY OF THE INVENTION

It is an object of this invention to obtain an automatic machine application program development system which makes the best use of the advantages of the conventional flowchart suitable for description of the sequence control program such as sequence processing, and enables description of parallel execution processing, interruption processing and the like by extending the conventional flowchart, in other words, which makes it possible to describe all programs essential for the operation of automatic machines, and computer products.

The automatic machine application program development system according to one aspect of this invention, comprises a program development unit which includes a tool area in which a new component, being an element for describing a program as a flowchart, is installed, and a drawing area for creating a flowchart using this new component. The new component includes at least one of a parallel execution component intervened in the flowchart in the drawing area and having a single input and a plurality of outputs and a parallel execution waiting component being in pair with this parallel execution component and having a plurality of inputs and a single output, an interruption component arranged using an interruption line extended in a direction perpendicular to a main stream of the flowchart, and a subroutine component intervened in the flowchart and including a subroutine program.

The automatic machine application program development system according to another aspect of this invention, comprises a program execution unit which executes a flowchart developed in a drawing area using a new component. The new component, being an element for describing a program as a flowchart, includes at least one of a parallel execution component intervened in the flowchart in the drawing area and having a single input and a plurality of outputs and a parallel execution waiting component being in pair with this parallel execution component and having a plurality of inputs and a single output, an interruption component arranged using an interruption line extended in a direction perpendicular to a main stream of the flowchart, and a subroutine component intervened in the flowchart and including a subroutine program.

According to the computer program as still another aspect of this invention, a program development method according to still another aspect of this invention, comprises steps of installing a new component, being an element for describing a program as a flowchart, in a tool area, and developing a flowchart using the new component in a drawing area. The new component includes at least one of a parallel execution component intervened in the flowchart in the drawing area and having a single input and a plurality of outputs and a parallel execution waiting component being in pair with this parallel execution component and having a plurality of inputs and a single output, an interruption component arranged using an interruption line extended in a direction perpendicular to the main stream of the flowchart, and a subroutine component intervened in the flowchart and including a subroutine program, can be executed by a computer.

According to the recording medium which stores the computer program as still another aspect of this invention, a program development method according to still another aspect of this invention, comprises steps of installing a new component, being an element for describing a program as a flowchart, in a tool area, and developing a flowchart using the new component in a drawing area. The new component includes at least one of a parallel execution component intervened in the flowchart in the drawing area and having a single input and a plurality of outputs and a parallel execution waiting component being in pair with this parallel execution component and having a plurality of inputs and a single output, an interruption component arranged using an interruption line extended in a direction perpendicular to the main stream of the flowchart, and a subroutine component intervened in the flowchart and including a subroutine program, can be executed by a computer.

Other objects and features of this invention will become apparent from the following description with reference to the accompanying drawings.

BRIEF DESCRIPTION OF THE DRAWINGS

FIG. 9 is the conventional flowchart in which the example of the program development shown in FIG. 8 is rewritten, FIG. 13A and FIG. 13B are diagrams, each of which shows an example of program development, which is a sixth embodiment of this invention, and FIG. 14A and FIG. 14B are diagrams, each of which shows an example of program development, which is also the sixth embodiment.

DETAILED DESCRIPTION

Embodiments of this invention will now be explained in detail with reference to the accompanying drawings.

Figure 3A:
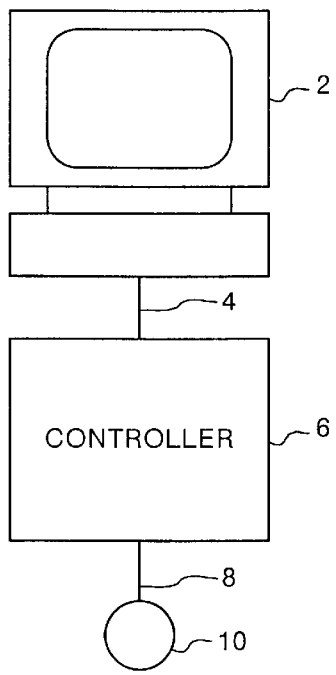
FIG. 3A to FIG. 3C show connection diagrams, each between a programming unit, a controller, and a peripheral device.
Figure 3B:
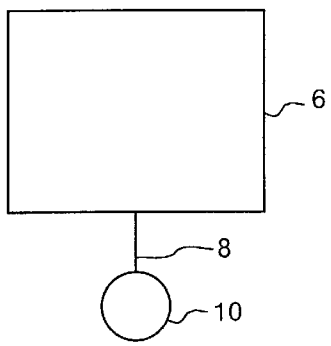
Figure 3C:
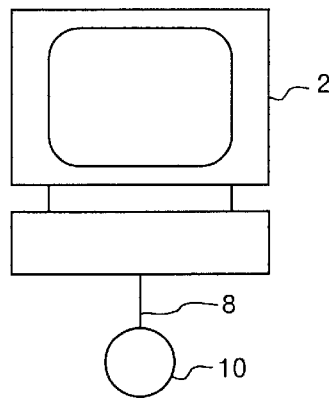

FIG. 3A to FIG. 3C show a first embodiment of this invention, and are block diagrams each of which shows a connection example between a programming unit, a controller and a peripheral input/output device. In FIG. 3A, the programming unit 2 (or a program development unit) including a monitor and the controller 6 are connected by a first connection unit 4, and the controller 6 and the input/output device 10 are connected by a second connection unit 8.

The programming unit 2 is generally a personal computer, but may be a personal digital assistant (PDA), a handy terminal prepared exclusively for programming, a gaming machine (for example, a portable gaming machine) which is provided with a display screen for a monitor and is singly used, or another gaming machine which is used by being connected to a television receiver used as a display screen.

As the controller 6, a special purpose controller may be used, or a controller based on a personal computer may be used. This controller 6 is connected to the first connection unit 4, and has a program input/output section (not shown) connected to the programming unit 2. Also, the controller 6 is connected to the second connection unit 8, and has an input section (not shown) to which various input devices such as a sensor for inputting signals and a switch are connected, and an output section (not shown) to which various output devices such as a motor to be controlled and a display are connected. The controller 6 also has an operation section and a memory (not shown). A program which is created in the programming section 2 to describe commands (instructions) to the input/output device 10, is installed in this controller 6. The command (instruction) described by the program created by the programming unit 2 is transmitted to the input/output device 10, thereby the automatic machine operates.

FIG. 3A shows an example in which the programming unit 2 and the controller 6 are separately constructed, but as shown in FIG. 3B, the programming unit 2 may be integral with the controller 6. In FIG. 3B, the controller 6 has the function of the programming unit 2. In this example, the controller 6 preferably has a monitor display section and an operation section such as a preset button or the like used when the program is created. When the monitor display section has the function of a touch panel or the like, the operation section such as a preset button may not be provided.

FIG. 3C shows another example in which the programming unit 2 is integral with the controller 6, where the programming unit 2 has the function of the controller 6.

The first connection unit 4 and the second connection unit 8 may be the same connection form or may be different connection form, and these may be a wired connection comprising a serial bus (RS232C, USB, IEEE13945 or the like) or a parallel bus, or may be a wireless connection such as Bluetooth, IEEE802.11, or the like.

Figure 4A:
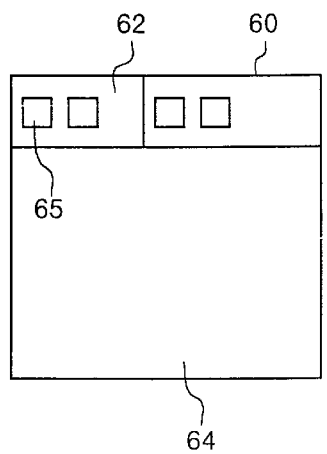
FIG. 4A to FIG. 4C show diagrams which exemplify the program development environment.
Figure 4B:
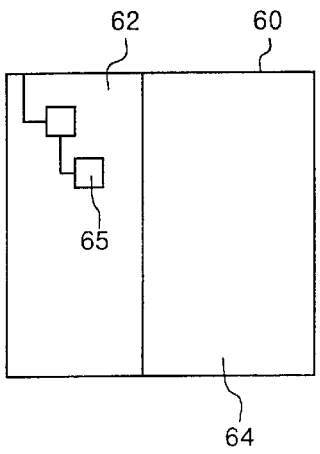
Figure 4C:
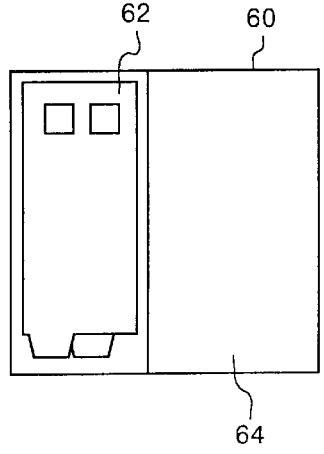

FIG. 4A to FIG. 4C are diagrams each of which shows an example of the program development environment on the monitor display screen in the programming unit 2 shown in FIG. 3A. This program development environment comprises an overall screen 60 for a program development environment, a tool area 62 for classifying program components ("components") 65 by type into elements required at the time of describing the flowchart and providing the elements, and a programming area 64 (also referred to as a drawing area 64). When there are a large number of components 65, it is desired to provide the components classified by type. In this case, the tool area 62 may be a tool bar in which the area is divided by type as shown in FIG. 4A, may be a tree view display by type as shown in FIG. 4B, or may be displayed by preparing a tab by type as shown in FIG. 4C.

The component 65 will be explained. The component 65 is an element used for the conventional flowchart, so-called a "processing" or "judgment" element which is described as a component, as well as a "state" element used in an automaton which is also described as a component, thereby a so-called state transition in which the state shifts can be also described. For example, the parallel execution and parallel execution waiting components, interruption component and subroutine component described later are components clearly expressing the "state". Therefore, in the present invention, the conventional flowchart can be extended to there by understand it as a state transitional flowchart.

In the present invention, the component 65 can be described not only as the "processing" and "judgment" elements and the "state" element, but also as an "object" in the object-oriented programming in which the processing and the state are integrated (referred to as a "device component" representing a device). For example, if a "motor" is assumed to be an object, the operation procedure and the operation state of the motor can be comprehended by the object.

In describing the flowchart in which such components 65 are used as elements, the components 65 provided in the tool area 62 are arranged in an optional position in the programming area 64, and the arranged components 65 are connected with each other by a line (an arrow), thereby a flowchart describing program can be created. The line (arrow) herein shows only the "sequence" as in the conventional flowchart, and does not show the direction or flow of data.

Figure 5A:
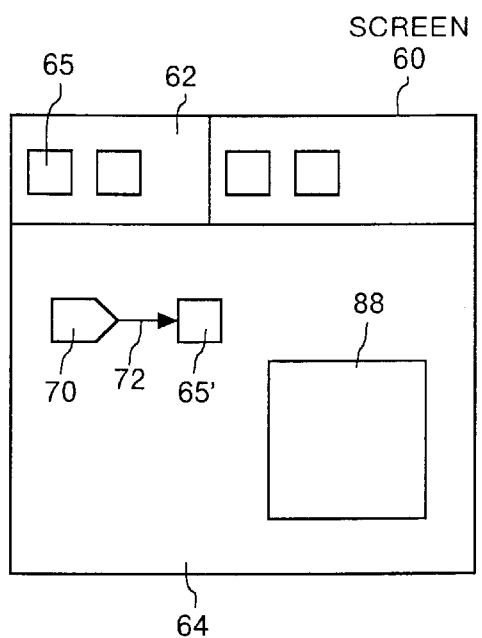
FIG. 5A and FIG. 5B are diagrams each of which shows an example of program development, which is a first embodiment of this invention.
Figure 5B:
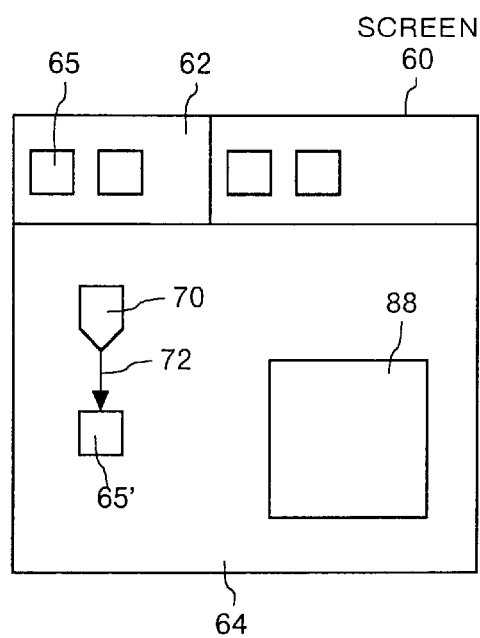

The explanation of the embodiment from FIG. 5A and FIG. 5B onward is concluded based on the explanation made for FIG. 3A to FIG. 3C and FIG. 4A to FIG. 4C. Therefore, the explanation for FIG. 3A to FIG. 3C and FIG. 4A to FIG. 4C can be added to the explanation of each embodiment from FIG. 5A and FIG. 5B onward.

FIG. 5A and FIG. 5B are diagrams each of which shows an example of program development according to this first embodiment. In the program development environment screen 60, one of the components 65 presented in the tool bar as the tool area 62 is selected and arranged as an "arranged component 65'" on the programming area 64. This arranged component 65' is connected by an arrow 72 with a starting component 70 which is arranged in the programming area 64 and shows a start of program in advance according to the conventional flowchart format. At this time, a window 88 for describing the operation of the arranged component 65' can be displayed. This window 88 is displayed by for example double clicking the arranged component 65', and this window 88 is closed when description of the displayed operation is completed. When the operation of the component 65' is special, a window 88 peculiar to the arranged component 65' is displayed corresponding to the type of the component. When the operation of a component 65' that cannot be described sufficiently is displayed in the window 88, it is also possible to start up a dialogue box or application software in the window 88 to describe the operation. If the application software is used, further complicated operation can be described.

A sequential relation between the description by the arrow 72 and the operation description in the window 88 may be such that the respective components are connected with each other by a line (an arrow) after the operation of each arranged component 65' is described, or such that the operation of the arranged component 65' is described after respective components are connected with each other by a line (an arrow). Further, the operation content of the arranged component 65' can be displayed with plural kinds of bitmap icons according to the operation described in the window 88. By doing this, the legibility of the program by this flowchart can be further improved.

The flowchart shown in FIG. 5A is drawn horizontally, but as shown in FIG. 5B, it may be drawn vertically. It may be drawn such that it is started by being horizontally drawn, and then it is changed to vertical drawing on the way. The direction of the flowchart maybe in any direction. In this case, the arranged component 65' is made rotatable in an optional angle, so that the flow of the flowchart becomes optional. That is, the inlet and the outlet of the arrow (flow line) 72 can be directed to an optional direction.

Figure 6:
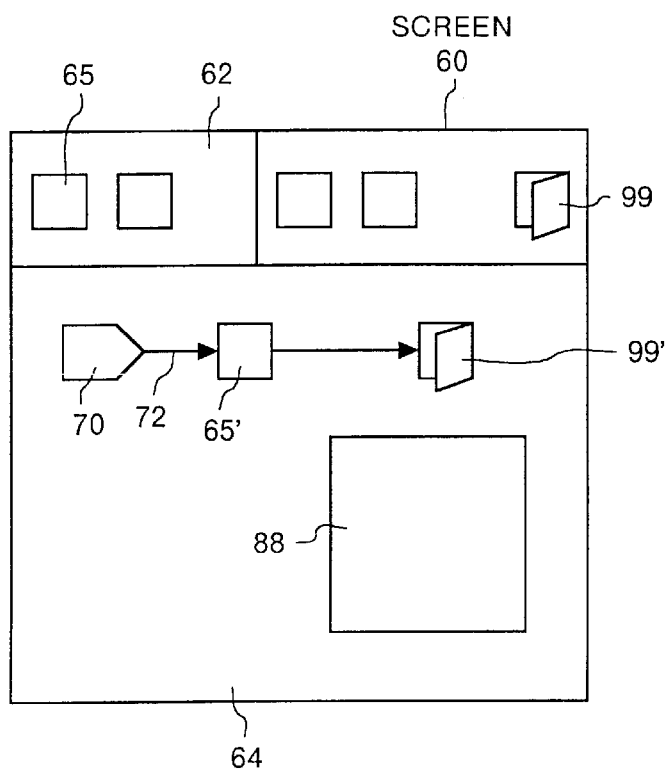
FIG. 6 is a diagram which shows an example of program development, which is a second embodiment of this invention.

A second embodiment of this invention will be explained with reference to FIG. 6 and FIG. 7. In this second embodiment, another component is added to the components based on the first embodiment shown in FIG. 5. FIG. 6 is a diagram which shows one example of program development according to the present invention, and description of the program termination will be explained.

This program development environment comprises the program development environment screen 60, the tool area 62 for providing components 65 as elements at the time of describing the flowchart by being classified by type, and the programming area 64. In the tool bar which is the tool area 62, there is presented a program termination component 99 as a component representing an element in the final state. When a user (programmer) wants to describe the end of the program, he/she selects this program termination component 99, and arranges this in the programming area 64 to make it an "arranged program termination component 99'". This arranged program termination component 99' has one inlet but does not have an outlet, different from the other arranged component 65' which has one inlet and one outlet. For example, in FIG. 6, an arrow 72 which becomes the main stream in the flowchart comes out from the starting component 70 of the flowchart, goes through the arranged component 65' and is connected to the arranged program termination component 99', thereby describing that the program will end at this point.

The flowchart program created as described above is transmitted from the programming unit 2 to the controller 6 shown in FIG. 3. At this time, the flowchart program is changed to a format that can be executed by the controller 6, according to need.

Figure 7:
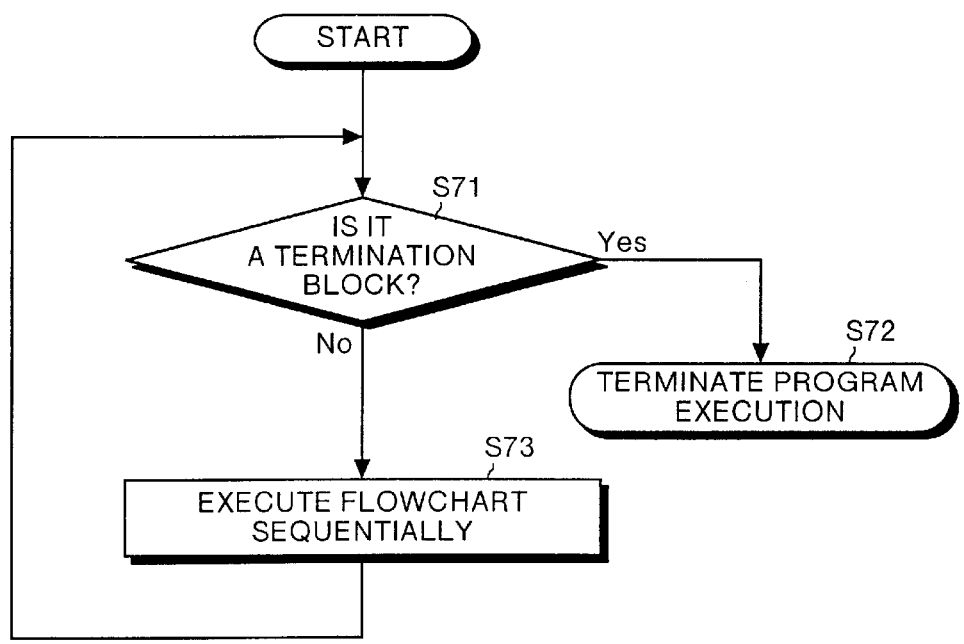
FIG. 7 is the conventional flowchart in which the example of the program development shown in FIG. 6 is rewritten.

FIG. 7 shows one example of an execution procedure of the flowchart program, when the program is executed by the controller 6. That is, a program execution unit such as the controller 6 or an interpreter which exists in advance in the controller 6 for executing the program executes the flowchart program sequentially. When the arranged program termination component 99' is executed (Yes at step S71), execution of the program is terminated (step S72). If the program is not terminated at step S71, the flowchart program is sequentially executed successively (step S73).

Figure 8:
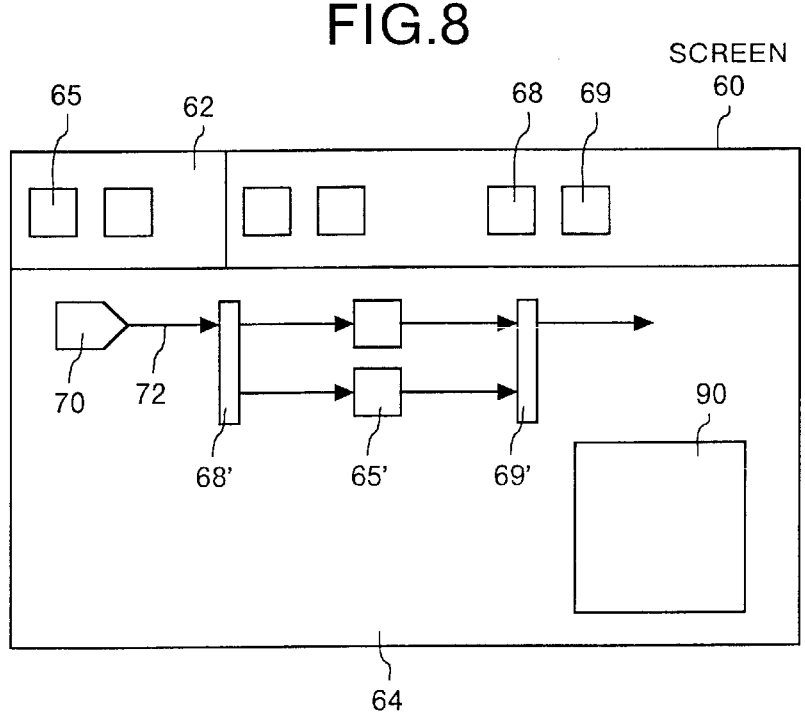
FIG. 8 is a diagram which shows an example of program development, which is a third embodiment of this invention.

A third embodiment of this invention will be explained with reference to FIG. 8 and FIG. 9. In this third embodiment, another components are added to the components based on the first embodiment shown in FIG. 5. FIG. 8 is a diagram which shows one example of the program development according to the present invention, and description of parallel execution will be explained.

This program development environment comprises the program development environment screen 60, the tool area 62 for providing components 65 as elements at the time of describing the flowchart by being classified by type, and the programming area 64. In the tool bar which is the tool area 62, there is presented a parallel execution component 68 as a component representing an element in the parallel execution state. When a user (programmer) wants to describe a parallel execution program, he/she selects this parallel execution component 68, and arranges this in the programming area 64 to make it an "arranged parallel execution component 68'".

This arranged parallel execution component 68' has one inlet and two outlets, different from the other arranged components 65' which have one inlet and one outlet. For example, in FIG. 8, it is described that an arrow 72 which becomes the main stream in the flowchart comes out from the starting component 70 of the flowchart, and is connected to the arranged parallel execution component 68', and from this arranged parallel execution component 68', two arrows (flow lines) come out, and hence the flows to be executed in parallel are two. Here, the number of flows to be executed in parallel is described in the programming area 64 by the number of parallel flow lines. However, as another description, the number of flows to be executed may be described together with the components in the parallel flow in a window (by description of operation, dialogue box, or application software) 90 which is opened by double clicking the arranged parallel execution component 68'. Respective programs executed in parallel, when the parallel execution is carried out, are respectively described as a flowchart starting from the arranged parallel execution component 68'.

In the tool bar which is the tool area 62, there is presented a parallel execution waiting component 69 as a component representing an element in the parallel execution waiting state. When a user (programmer) wants to perform waiting of parallel execution at the time of describing the parallel execution program, he/she selects this parallel execution waiting component 69, and arranges this in the programming area 64 to make it an "arranged parallel execution waiting component 69'". This arranged parallel execution waiting component 69' has one outlet and two or more inlets corresponding to the arranged parallel execution component 68', different from the other arranged components 65' which have one inlet and one outlet. For example, in FIG. 8, it is described that two arrows come out from the arranged parallel execution component 68', and enter to the arranged parallel execution waiting component 69', and one arrow which becomes the main stream of the flowchart comes out from this arranged parallel execution waiting component 69'. Here, the number of flows to perform waiting is described in the programming area 64 by the number of parallel flow lines. However, as another description, the number of flows to perform waiting may be described by a description method such as a window (by description of operation, dialogue box, or application software) 90 which is opened by double clicking the arranged parallel execution waiting component 69'.

As described above, the flowchart program including the description of the parallel execution program and the description of the parallel execution waiting program is transmitted from the programming unit 2 to the controller 6. At this time, the flowchart program is changed to a format that can be executed by the controller 6, according to need.

FIG. 9 shows one example of an execution procedure of the flowchart program including the parallel execution description and the parallel execution waiting description when the program is executed by the controller 6. That is, the program execution unit such as the controller 6 or an interpreter which exists in advance in the controller 6 for executing the program executes the flowchart program sequentially. When the arranged parallel execution component 68' is executed (Yes at step S91), the program is executed while giving chances of execution equally to each flow to be executed in parallel (step S92). For example, when there are two flows, a first flow and a second flow to be executed in parallel, as shown in FIG. 8, the program execution unit gives chances of execution equally such that it first executes the first flow by one step (this means a program step and is not a step in the flowchart in FIG. 8), and then executes the second flow by one step, not executing the next step in the first flow, and thereafter returns to the first flow to execute the next step, and then executes the next step in the second flow. As another example, when the program execution unit is using a multi-task OS, it may execute the step as one task (process) with respect to each flow to be executed in parallel, and equally allocate the priority of each task (process), in other words, the chances of execution to each flow.

When the arranged parallel execution waiting component 69' is to be executed (Yes at step S93), the program execution unit completes all the parallel execution flows connected to the arranged parallel execution waiting component 69', and then proceeds to the next step of the arranged parallel execution waiting component 69', that is, continuously executes each flow to be executed in parallel while giving chances of execution equally to each of the flows. That is, this state is kept, and when all the parallel execution flows which should wait have completed (step S94), the program execution unit proceeds to the next flowchart program (step S95) of the parallel execution waiting component 69'. Thus, execution of the parallel execution program and the parallel execution waiting program becomes possible.

Figure 1A:
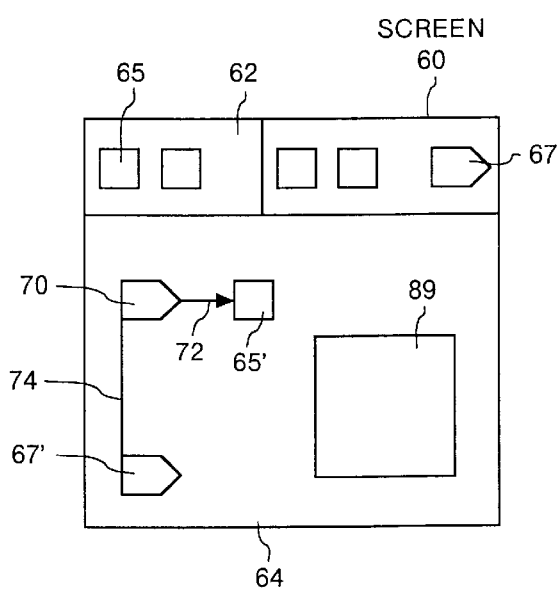
FIG. 1A and FIG. 1B are diagrams, each of which shows an example of program development, which is a fourth embodiment of this invention.
Figure 1B:
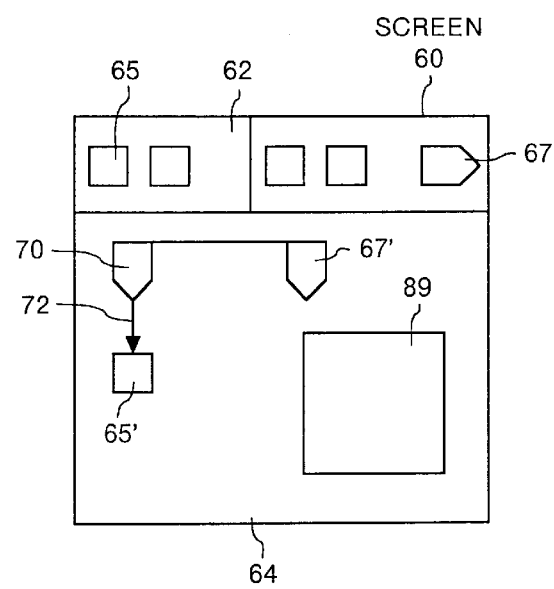

A fourth embodiment of this invention will be explained with reference to FIG. 1A, FIG. 1B, and FIG. 2. In this fourth embodiment, another component is added to the components based on the first embodiment shown in FIG. 5. FIG. 1 shows one example of the program development according to the present invention, and description of interruption will be explained here.

This program development environment comprises the program development environment overall screen 60, the tool area 62 for providing components 65 as elements at the time of describing the flowchart by being classified by type, and the programming area 64. In the tool bar which is the tool area 62, there is presented an interruption component 67 as a component representing an element in the interrupted state. When a user (programmer) wants to describe an interruption program, he/she selects this interruption component 67, and arranges this in the programming area 64 to make it an "arranged interruption component 67'". This arranged interruption component 67' is arranged in a predetermined position in the direction other than the main stream of the flowchart, since there is a restriction resulting from the interruption function in the place where the interruption component 67 is arranged, different from that the other arranged components 65' can be arranged in an optional position of the main stream of the flowchart. For example, in FIG. 1A, the arrow 72 which shows the main stream of the flowchart comes out from the starting component 70 of the flowchart, and the interruption component 67 is arranged in the direction perpendicular to the direction of the arrow 72, and connected to the starting component 70 using an interruption line 74 extended in the direction perpendicular to the direction of the main stream. The effective range of interruption is set to the downstream side of the portion where the interruption line 74 is derived in the main stream of the flowchart, and evaluation of the interruption condition is carried out.

The interruption condition is described in the programming area 64. However, as another description, the interruption condition may be described in an other description method such as a window (by description of operation, dialogue box, or application software) 89 which is opened by double clicking the arranged interruption component 67'. The arranged interruption component 67' may be displayed with a plurality of kinds of bitmap icons corresponding to the interruption condition described in the window 89, and hence the legibility of the flowchart program is further improved. When an interruption occurs, description of the flowchart starting from the arranged interruption component 67' becomes a program to be executed as the interruption processing. In this manner, interruption can be performed by deriving an interruption line 74 perpendicular to the main stream of the flowchart to arrange the interruption component 67. If a plurality of interruption components 67' are arranged on the same interruption line, a plurality of interruption conditions can be described. In this case, the above-described parallel processing component and a subroutine component described later may be interposed in the interruption processing flow starting from the arranged interruption component 67'. FIG. 1A shows a horizontally written flowchart, and FIG. 1B shows a vertically written flowchart.

The flowchart program including the interruption description created in the above-described manner is transmitted from the programming unit 2 to the controller 6 shown in FIG. 3A. At this time, the flowchart program is changed to a format that can be executed by the controller 6, according to need.

Figure 2:
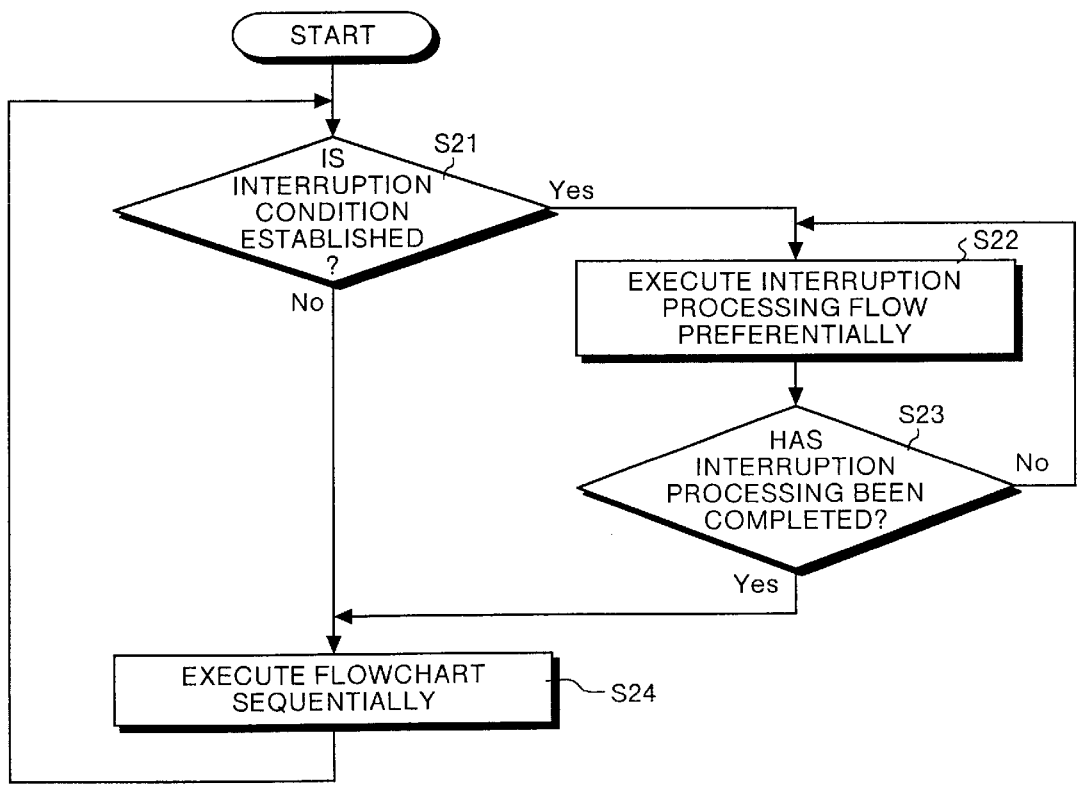
FIG. 2 is a conventional flowchart in which the example of the program development shown in FIG. 1 is rewritten.

FIG. 2 shows one example of an execution procedure of the flowchart program including the interruption description when the program is executed by the controller 6. That is, the program execution unit such as the controller 6 or an interpreter which exists in advance in the controller 6 for executing the program executes the flowchart program sequentially. When the interruption condition described by the arranged interruption component 67' has been established (step S21), the described interruption processing program is preferentially executed in the flow coming out from this interruption component 67' (step S22). That is, when the interruption condition has not been established, the program execution unit sequentially executes the main stream of the flowchart program, and when the interruption condition has been established, the program execution unit suspends the execution of the main stream of the flowchart program, and preferentially executes a program to be executed as the interruption processing instead. When the interruption processing has been completed (step S23), the program execution unit executes the next step in the main stream of the flowchart program (step S24).

More specifically, the program execution unit first confirms the interruption condition, and executes only one step in the main stream of the flowchart program when the interruption condition has not been established. Then, the program execution unit again confirms the interruption condition, and executes only one step in the main stream of the flowchart program when the interruption condition has not still been established. In this manner, the program execution unit sequentially executes the main stream of the flowchart program. When the interruption condition has been established, the program execution unit suspends the execution of the main stream of the flowchart program, and preferentially executes a program to be executed as the interruption processing instead. When the interruption processing has been completed, the program execution unit executes the next step in the main stream of the flowchart program. As another example, when the program execution unit is using a multi-task OS, it may execute the step as one task (process) with respect to each flow to be interrupted. In this case, the priority of each task (process), in other words, a chance of execution, may be set higher than the execution of the main stream of the flowchart program. Even when the interruption execution is being performed, the main-stream program of the flowchart program is executed to some extent since it is using the multi-task OS. In this manner, the execution of the interruption program described in the flowchart becomes possible.

Figure 10A:
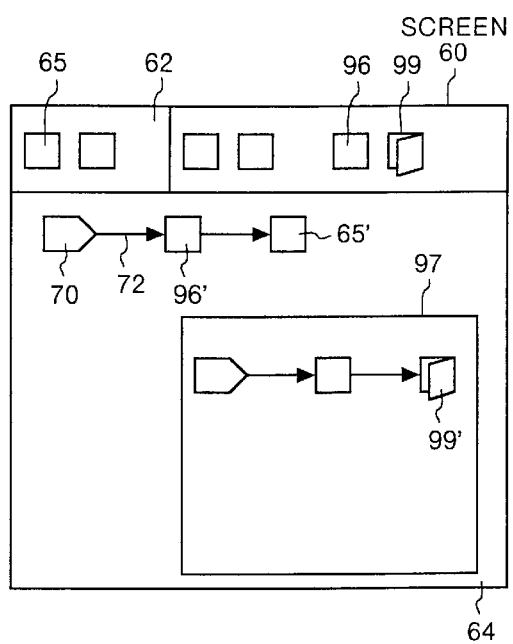
FIG. 10A and FIG. 10B are diagrams, each of which shows an example of program development, which is a fifth embodiment of this invention.

A fifth embodiment of this invention will now be explained with reference to FIG. 10A, FIG. 10B to FIG. 12. In this fifth embodiment, another component is added to the components based on the first embodiment shown in FIG. 5, the second embodiment shown in FIG. 6, and the fourth embodiment shown in FIG. 1. FIG. 10A, FIG. 10B to FIG. 12 show one example of the program development according to the present invention, and subroutine description will be explained here. This program development environment comprises the program development environment overall screen 60, the tool area 62 for providing components 65, the program termination component 99 (here, subroutine termination component 99) and the interruption component 67 as elements at the time of describing the flowchart, by being classified by type, and the programming area 64. In the tool bar which is the tool area 62, there is presented a subroutine component 96 as a component representing a state element of the subroutine. When a user (programmer) wants to describe a subroutine program, he/she selects this subroutine component 96 and arranges this in the programming area 64 to make it an "arranged subroutine component 96'". This arranged subroutine component 96' can be arranged in the main stream of the flowchart, as with the other arranged components 65', but the subroutine component 96 itself includes a subroutine program. The included subroutine program is described in the programming area 64, but as another description, it may be described in a subroutine programming area 97 such as a window which is newly opened by double clicking the arranged subroutine component 96' or by other description methods. When the user (programmer) wants to describe termination of the subroutine, of the included subroutine program descriptions, as shown in FIG. 10A, he/she selects the subroutine termination component 99, and arranges this in the subroutine programming area 97 to make it an "arranged subroutine termination component 99'".

FIG. 10A shows description of a simple subroutine. That is to say, when the main program is executed to reach the arranged subroutine component 96', the program in the window 97 included in this subroutine component 96' is sequentially executed, and when the lastly arranged subroutine termination component 99' has been executed, the subroutine is terminated, and the next step in the main program is executed. In this case, the processing flow of the subroutine can include the above-described parallel execution component.

Figure 10B:
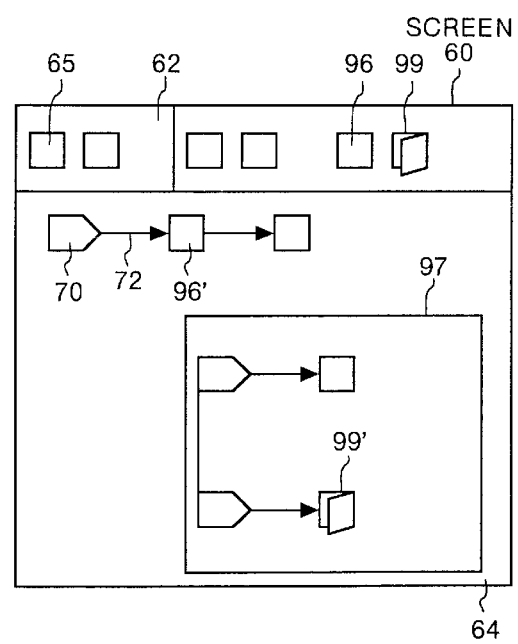

FIG. 10B is a program in which a subroutine shows one state and state transition is described. When the main program is executed to reach the arranged subroutine component 96', the main stream in the subroutine and the interruption component which are included in the subroutine component 96' shown in the window 97 are executed. That is, while evaluating the interruption condition within the subroutine, the programs in the main stream of the subroutine are sequentially executed. When execution of the last flowchart element in the main stream of the subroutine has been completed, execution of the main stream in the subroutine is terminated. However, the interruption condition in the subroutine is continuously evaluated without termination of the subroutine, and when the subroutine termination component 99' is executed at the point in time at which the interruption condition has been established, the subroutine is then terminated, and control returns to the main program to execute the next step.

Figure 11:
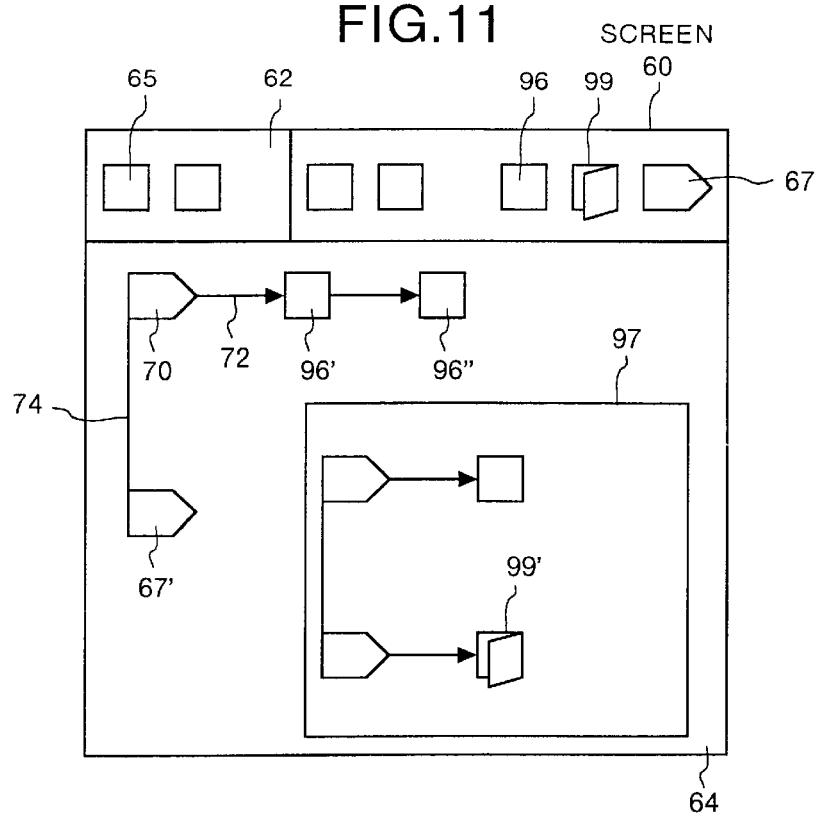
FIG. 11 is a diagram which shows another example of program development, which is also the fifth embodiment.

FIG. 11 shows description of a subroutine in addition to the fourth embodiment, where the construction is such that the flowchart has an interruption component 67' arranged via an interruption line 74 from the starting component 70 arranged in the main stream of the flowchart, and the arranged subroutine components 96', 96" are provided in series in two stages in the main stream of the flowchart. The interruption condition of the arranged interruption component 67' is always evaluated while the mainstream program is executed. The interruption condition here is the content of the subroutine described in the window 97 of the subroutine component 96' arranged in the lower hierarchy in the mainstream program. This interruption condition is evaluated only while the arranged subroutine component 96' is being executed. After having got out from the subroutine 96', if the content of the subroutine component 96" arranged in the next lower hierarchy has an interruption component as in the description of the window 97, this interruption condition is evaluated only when the arranged subroutine component 96" is being executed. Even when the interruption conditions of the arranged subroutine components 96' and 96" are being executed, the interruption condition of the arranged interruption component 67' is evaluated at all times while the mainstream program is executed.

Figure 12:
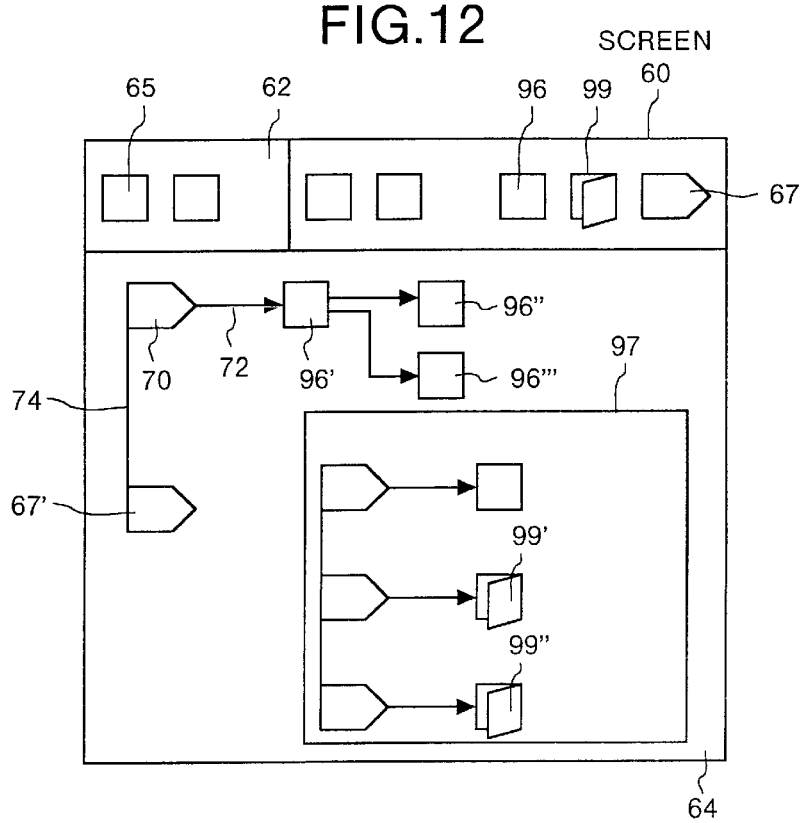
FIG. 12 is a diagram which shows another example of program development, which is also the fifth embodiment.

FIG. 12 shows an example in which the subroutine component 96 has two outlets based on the description in FIG. 11. In the descriptions in FIG. 10A, FIG. 10B and FIG. 11, the subroutine component has one outlet, but for example, the number of outlets can be changed to two or more by a dialogue or the like through which the property of the subroutine component 96 is set, or the number of outlets of the subroutine component 96 can be automatically changed according to the number of the outlet number set in the subroutine termination component 99 described in the program included in the subroutine component 96. In the description example in FIG. 12, two interruption components shown in the window 97 are comprised in the program included in the subroutine component 96, and an outlet number 1 is set in the subroutine termination component 99'. When this subroutine termination component 99' is evaluated, state transition is performed from the subroutine component 96' to the subroutine component 96", and when the subroutine termination component 99" in which an outlet number 2 is set is evaluated, state transition is performed from the subroutine component 96' to the subroutine component 96'".

The flowchart program including the subroutine created as described above is transmitted from the programming unit 2 to the controller 2 shown in FIG. 3A. At this time, the flowchart program is changed to a format that can be executed by the controller 6, according to need.

A sixth embodiment of this invention will be explained with reference to FIG. 13A, FIG. 13B, FIG. 14A, and FIG. 14B. In this sixth embodiment, another component is added to the components based on the first embodiment shown in FIG. 5 and the fourth embodiment shown in FIG. 1. FIG. 13A, FIG. 13B, FIG. 14A, and FIG. 14B are respectively a diagram which shows one example of the program development according to the present invention, and description when the component is an object (device component) will be explained.

This program development environment comprises the program development environment overall screen 60, the tool area 62 for providing components 65 as elements at the time of describing the flowchart by being classified by type, and the programming area 64, and a device display window area 54. In the tool bar which is the tool area 62, there is presented the interruption component 67 as a component representing an element of the interrupted state. When a user (programmer) wants to describe an interruption program, he/she selects this interruption component 67, and arranges this in the programming area 64 to make it an "arranged interruption component 67'". Further, when the user (programmer) wants to describe device components 50 and 51, being objects, he/she selects this device component 50 or 51 from the device display window area 54, and arranges this in the programming area 64 to make it an "arranged device component 50' or 51'" (not shown in FIG. 13).

As shown in FIG. 13A, for example, when the interruption condition is described mainly for the device component 50, the description of the device component 50 in the arranged interruption component 67' is performed by selecting the device component 50 in the device display window area 54, and dragging and dropping this device component 50 onto the interruption component 67'. For example, as shown in FIG. 13B, by double clicking this dragged and dropped interruption component 67', a window 55 is displayed in the programming area 64. The interruption condition is then described using a dialogue displayed in the window 55, and the condition description dialogue is displayed so that a method of controlling this device component 50 which is included in the device component 50 is described therein. When the device component 50 is displayed in the interruption component 67' thus arranged, it can be clearly shown that the device component 50 is set as the interruption condition, thereby improving the legibility of the flowchart. If a bitmap is displayed appropriately for the condition set by the device component 50, the legibility thereof is further improved.

FIG. 14A and FIG. 14B show examples of how the device component 50 as an object at the time of describing the condition of the arranged interruption component 67' is selected. When the arranged interruption component 67' shown in FIG. 14A is double clicked, the condition description dialogue 55 shown in FIG. 14B is displayed, where the device component 50 or 51 which is desired to be the condition is selected by clicking a conditional device adding button 58 in this dialogue 55. The selected device is displayed as the arranged device component 50' or 51' in the condition column 57. The device component 50' or 51' which becomes the condition, and the condition column 57 are coupled with the "and" condition or "or" condition, thereby a condition in which a plurality of devices are combined can be described.

In this manner, the operation at the time of describing the condition can be simplified, even for a single device as shown in FIG. 13A and FIG. 13B, or for a plurality of devices as shown in FIG. 14A and FIG. 14B. Intuitive description can be performed by a description method based on mainly the device component which becomes an object, for example, when describing the interruption condition.

The device may be an object to be controlled in the prior art according to the inventor of the present invention, Japanese Patent Application Laid-Open No. 2002-7299, and this object has a software module and can be obtained from a database server, for example, via a communication line. In this case, the object to be controlled is specified by the global ID or other specifiable corresponding data. The software module has at least one icon displayed in the display area, a unit (procedure) which describes a method of controlling the object to be controlled, a unit (procedure) which describes the object to be controlled as an object for comparison of conditions, a unit (procedure) which executes the method of controlling the object to be controlled, and a unit (procedure) which executes the method of comparing the conditions between the objects to be controlled.

The automatic machine application program development system of this invention has been explained in the first to the sixth embodiments. This development system is understood as a programming unit or a programming method, as seen from the computer or the controller, and is also understood as a program display unit, if the display such as a monitor is included. Further, in view of the execution of the automatic machine such as the controller, this development system can be understood as a program execution unit. The programming method becomes a program, if it is programmed so that it can be executed by a computer, and also becomes a recording medium which stores this program.

As explained above, according to one aspect of the invention, the automatic machine application program development system comprises the tool area in which a new component, being an element for describing a program as a flowchart, is installed, and the drawing area for creating a flowchart using this new component. The new component comprises at least one of the parallel execution component intervened in the flowchart in the drawing area and having a single input and a plurality of outputs, and a parallel execution waiting component being in pair with this parallel execution component and having a-plurality of inputs and a single output, an interruption component arranged using an interruption line perpendicular to the main stream of the flowchart, and a subroutine component intervened in the flowchart and including a subroutine program. Thereby, respective elements of parallel execution, parallel execution waiting, interruption, and subroutine are added as the elements of the flowchart, or handled as state elements, or a hierarchical structure is formed in some cases. As a result, it is possible to create a program having good legibility with a simple description, and describe all programs essential for the operation of the automatic machine.

Furthermore, in the parallel execution component and the parallel execution waiting component, chances of execution are allocated equally to parallel execution flow lines described in the drawing area. As a result, at the time of parallel execution, the number of parallel execution flow lines to be executed equally can be described, for example, in the window, and hence simple description or the legibility of the program can be further improved.

Moreover, in the interruption component, the interruption condition described in the window formed in apart of the drawing area is evaluated. As a result, program description which has been impossible by the conventional flowchart becomes possible by adding and describing the interruption element, and hence a simple program having good legibility can be obtained.

Furthermore, in the subroutine program of the subroutine component that can be described in the window formed in apart of the drawing area, the sequence processing is described and a subroutine termination component is lastly described, or an interruption component is described using an interruption line extended in a direction perpendicular to the main stream of the subroutine, and a subroutine termination component to which the processing shifts in response to the establishment of the condition is described in the downstream of the interruption component, while evaluating the interruption condition with respect to the main stream thereof. Hence, at the time of describing the subroutine, the contents of the subroutine program can be described in the hierarchical structure, and the interruption description can be included in the contents of the subroutine. As a result, simple description and the legibility of the program can be further improved.

Moreover, the subroutine component has a plurality of outlets, and a plurality of outlet numbers can be set to the subroutine termination component. Thereby, the contents of the subroutine program can be described at the plurality of outlets, in describing the subroutine, and as a result, simple description and the legibility of the program can be further improved.

Furthermore, the interruption component is allowed to include a one or a plurality of objects to be controlled, which should be an interruption condition. The software module of this object to be controlled has at least one of a one or a plurality of icons displayed in a display area, a unit which describes a method of controlling the object to be controlled, and a unit which describes the object to be controlled as an object for condition comparison. Further, the software module of the object to be controlled is specified by a global ID or corresponding data. By having the object as a component, an object-oriented program can be obtained as a flowchart, and as a result, intuitive description becomes possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An automatic machine application program development system comprising a program development unit which includes:
   a graphical tool area in which a plurality of new components, being elements for describing a program as a flowchart, are depicted; and
   a drawing area for creating a flowchart using these new components, wherein the new components include:
      a parallel execution component intervening in the flowchart in the drawing area and having a single input and a plurality of outputs, and a parallel execution waiting component paired with the parallel execution component and having a plurality of inputs and a single output;
      an interruption component intervening in the flowchart in the drawing area but placed outside of a main stream of the flowchart, and connected to the main stream of the flowchart using an interruption line extending in a direction perpendicular to the main stream of the flowchart; and
      a subroutine component intervening in the flowchart and including a subroutine program.

2. The system according to claim 1, comprising a program development unit which allocates chances of execution in the parallel execution component and the parallel execution waiting component equally to parallel execution flow lines described in the drawing area.

3. The system according to claim 1, comprising a program development unit which evaluates an interruption condition, for the interruption component, described in a window in a part of the drawing area.

4. The system according to claim 1, comprising a program development unit which describes sequence processing and lastly describes, in a window in a part of the drawing area, one of
   a subroutine termination component in a subroutine program of the subroutine component, and
   an interruption component in a subroutine program of a subroutine component using an interruption line extending in a direction perpendicular to the main stream of the subroutine program, and a subroutine termination component, downstream of the interruption component, to which the processing shifts in response to establishment of a condition while evaluating an interruption condition with respect to the main stream of the subroutine program.

5. The system according to claim 4, comprising a program development unit in which the subroutine component has a plurality of outlets and a plurality of outlet numbers set to the subroutine termination component.

6. The system according to claim 1, comprising a program development unit in which the interruption component includes at least one object to be controlled, which is set as an interruption condition, and wherein
   a software module of the object to be controlled includes at least one of one icon displayed in a display area, a unit which describes a method of controlling the object to be controlled, and a unit which describes the object to be controlled as an object for condition comparison, and
   the software module of the object to be controlled is specified by a global ID or corresponding data.

7. An automatic machine application program development system comprising:
   a program execution unit which executes a flowchart developed in a drawing area using a plurality of new components, wherein the new components which are elements for describing a program as a flowchart, and include:
      a parallel execution component intervening in the flowchart in the drawing area and having a single input and a plurality of outputs, and a parallel execution waiting component paired with the parallel execution component and having a plurality of inputs and a single output,
      an interruption component intervening in the flowchart in the drawing area but placed outside of a main stream of the flowchart, and connected to the main stream of the flowchart using an interruption line extending in a direction perpendicular to the main stream of the flowchart, and
      a subroutine component intervening in the flowchart and including a subroutine program.

8. The system according to claim 7, comprising a program execution unit which allocates chances of execution for the parallel execution component and the parallel execution waiting component equally to parallel execution flow lines described in the drawing area.

9. The system according to claim 7, comprising a program execution unit which evaluates an interruption condition, for the interruption component, described in a window in a part of the drawing area.

10. The system according to claim 7, comprising a program execution unit which describes sequence processing in a subroutine program of the subroutine component that is described in a window in a part of the drawing area and executes lastly one of
    a subroutine termination component, and
    a subroutine termination component, described downstream of an interruption component, to which the processing shifts in response to establishment of a condition while evaluating the interruption component described using an interruption line extending in a direction perpendicular to the main stream of the subroutine program.

11. The system according to claim 10, comprising a program execution unit which executes the program based on a description in which the subroutine component has a plurality of outlets and a plurality of outlet numbers set to the subroutine termination component.

12. The system according to claim 7, comprising a program execution unit in which the interruption component includes at least one object to be controlled, which is set as an interruption condition, and wherein
    a software module of the object to be controlled includes at least one of a unit which executes a method of controlling the object to be controlled, and a unit which executes a method of comparing conditions of the objects to be controlled, and
    the software module of the object to be controlled is specified by a global ID or corresponding data.

13. A computer-executable program for describing a program development method, the method comprising:

depicting a plurality of new components being elements for describing a program as a flowchart, in a graphical tool area; and developing a flowchart using the new components in a drawing area, wherein the new components include:

a parallel execution component intervening in the flowchart in a drawing area and having a single input and a plurality of outputs, and a parallel execution waiting component paired with the parallel execution component and having a plurality of inputs and a single output, an interruption component intervening in the flowchart in the drawing area but placed outside of a main stream of the flowchart, and connected to the main stream of the flowchart using an interruption line extending in a direction perpendicular to the main stream of the flowchart, and a subroutine component intervening in the flowchart and including a subroutine program.

14. A recording medium which stores a computer-executable program in which a program development method is described, the method comprising:

depicting a plurality of new components, which are elements for describing a program as a flowchart, in a graphical tool area; and developing a flowchart using the new components in a drawing area, wherein the new components include:

a parallel execution component intervening in the flowchart in a drawing area and having a single input and a plurality of outputs, and a parallel execution waiting component paired with the parallel execution component and having a plurality of inputs and a single output, an interruption component intervening in the flowchart in the drawing area but placed outside of a main stream of the flowchart, and connected to the main stream of the flowchart using an interruption line extending in a direction perpendicular to the main stream of the flowchart, and a subroutine component intervening in the flowchart and including a subroutine program.

15. An automatic machine application program development system comprising a program development unit which includes:

a graphical tool area in which a plurality of new components, which are elements for describing a program as a flowchart, are depicted; and a drawing area for creating a flowchart using these new components, wherein the new components include a start component;

a parallel execution component intervening in the flowchart in the drawing area and having a single input and a plurality of outputs, and a parallel execution waiting component paired with the parallel execution component and having a plurality of inputs and a single output, wherein the parallel execution component and the parallel execution waiting component are connected to the start component using parallel flow lines; and an interruption component intervening in the flowchart in the drawing area but placed outside of a main stream of the flowchart, and connected to the main stream of the flowchart using an interruption line extending from the start component in a direction perpendicular to the main stream of the flowchart.

16. The system according to claim 15, further comprising a subroutine component intervening in the flowchart and including a subroutine program.

17. An automatic machine application program development system comprising:

a program execution unit which executes a flowchart developed in a drawing area using a plurality of new components, wherein the new components are elements for describing a program as a flowchart and include a start component;

a parallel execution component in the flowchart in the drawing area and having a single input and a plurality of outputs, and a parallel execution waiting component which is paired with the parallel execution component and having a plurality of inputs and a single output, wherein the parallel execution component and the parallel execution waiting component are connected to the start component using parallel flow lines; and an interruption component intervening in the flowchart in the drawing area but placed outside of a main stream of the flowchart, and connected to the main stream of the flowchart using an interruption line extending from the start component in a direction perpendicular to the main stream of the flowchart.

18. The system according to claim 17, further comprising a subroutine component intervening in the flowchart and including a subroutine program.

19. A computer-executable program for describing a program development method, the method comprising:

depicting a program as a flowchart, in a graphical tool area; and developing a flowchart using a plurality of new components in a drawing area, wherein the new components include a start component;

a parallel execution component intervening in the flowchart in the drawing area and having a single input and a plurality of outputs, and a parallel execution waiting component paired with the parallel execution component and having a plurality of inputs and a single output, wherein the parallel execution component and the parallel execution waiting component are connected to the start component using parallel flow lines; and an interruption component intervening in the flowchart in the drawing area but placed outside of a main stream of the flowchart, and connected to the main stream of the flowchart using an interruption line extending from the start component in a direction perpendicular to the main stream of the flowchart.

20. The system according to claim 19, further comprising a subroutine component intervening in the flowchart and including a subroutine program.

21. A recording medium which stores a computer-executable program in which a program development method is described, the method comprising:

depicting a plurality of new components, which are elements for describing a program as a flowchart, in a graphical tool area; and developing a flowchart using the new components in a drawing area, wherein the new components include a start component;

a parallel execution component intervening in the flowchart in the drawing area and having a single input and a plurality of outputs, and a parallel execution waiting component paired with the parallel execution component and having a plurality of inputs and a single output, wherein the parallel execution component and the parallel execution waiting component are connected to the start component using parallel flow lines; and an interruption component intervening in the flowchart in the drawing area but placed outside of a main stream of the flowchart, and connected to the main stream of the flowchart using an interruption line extending from the start component in a direction perpendicular to the main stream of the flowchart.

22. The system according to claim 21, further comprising a subroutine component intervening in the flowchart and including a subroutine program.

* * * * *